United States Patent
Kim et al.

(10) Patent No.: US 7,995,670 B2
(45) Date of Patent: Aug. 9, 2011

(54) METHOD OF TRANSMITTING AND RECEIVING DATA USING PRECODING CODEBOOK IN MULTI-USER MIMO COMMUNICATION SYSTEM AND TRANSMITTER AND RECEIVER USING THE METHOD

(75) Inventors: Ho-Jin Kim, Seoul (KR); Il-Han Kim, West Lafayette, IN (US); David J. Love, West Lafayette, IN (US); Seung-Young Park, West Lafayette, IN (US); Sung-Jin Kim, Suwon-si (KR); Yong-Xing Zhou, Yongin-si (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1111 days.

(21) Appl. No.: 11/802,775

(22) Filed: May 24, 2007

(65) Prior Publication Data

US 2007/0286304 A1 Dec. 13, 2007

Related U.S. Application Data

(60) Provisional application No. 60/802,793, filed on May 24, 2006.

(30) Foreign Application Priority Data

Sep. 15, 2006 (KR) .................. 10-2006-0089679

(51) Int. Cl.
*H04B 7/02* (2006.01)
(52) U.S. Cl. ...................... 375/267; 375/347
(58) Field of Classification Search .............. 375/267, 375/347, 296; 370/329
See application file for complete search history.

(56) References Cited

U.S. PATENT DOCUMENTS

2007/0165738 A1* 7/2007 Barriac et al. ................ 375/267
2007/0280386 A1* 12/2007 Waes et al. ................... 375/347
* cited by examiner

*Primary Examiner* — Temesghen Ghebretinsae
(74) *Attorney, Agent, or Firm* — NSIP Law, PC (57) ABSTRACT

Provided are a data transmitting and receiving method for a multiple-input multiple-output (MIMO) communication system, and a transmitter and a receiver using the method. Accordingly, since precoding matrices of a codebook is constituted using a rotation matrix, expansion of the codebook is easy, and since each of the precoding matrices is determined according to the number of transmit antennas, the codebook is systematically created according to a system. In addition the codebook can be applied to even a correlated channel, and the minimum distance between precoding matrices can advantageously be maximized.

18 Claims, 6 Drawing Sheets

METHOD OF TRANSMITTING AND RECEIVING DATA USING PRECODING CODEBOOK IN MULTI-USER MIMO COMMUNICATION SYSTEM AND TRANSMITTER AND RECEIVER USING THE METHOD

PRIORITY

This application claims benefit under 35 U.S.C. §119(e) of a provisional application entitled "Method of Transmitting and Receiving Data Using Precoding Codebook in Multi-User MIMO Communication System and Transmitter and Receiver Using the Method" filed in the United States Patent and Trademark Office on May 24, 2006 and assigned Ser. No. 60/802,793, and under 35 U.S.C. §119(a) of an application entitled "Method of Transmitting and Receiving Data Using Precoding Codebook in Multi-User MIMO Communication System and Transmitter and Receiver Using the Method" filed in the Korean Intellectual Property Office on Sep. 15, 2006 and assigned Serial No. 2006-89679, the entire contents of both of which are incorporated herein by reference.

BACKGROUND OF THE INVENTION

1. Field of the Invention

The following description relates generally to a multiple-input multiple-output (MIMO) communication system. More particularly, the following description relates to a method of transmitting and receiving data using a codebook, and a transmitter and a receiver using the method.

2. Description of the Related Art

A multiple-input multiple-output (MIMO) communication system is an important technology used to achieve a high data rate and reliability in a wireless channel. When multiple users are simultaneously present, even higher data rates can be achieved thanks to the gain offered by multi-user diversity. In order to exploit the full benefit of multi-user diversity, however, the transmitter requires full channel knowledge. In a real system, it is unrealistic to feedback all channel information to the transmitter. Accordingly, the transmitter can only count on a limited amount of feedback. Therefore, in a multi-user channel environment, a design scheme in which a transmitter only uses partial channel knowledge is required.

According to a conventional development of multi-user diversity, user diversity cannot be sufficiently used when each transmit antenna is allocated to a different user.

Thus, in a multi-user MIMO communication system, limited feedback information and multi-user diversity must be simultaneously considered to design a codebook. A codebook is a transmission precoding technology consisting of a set of transmission precoding matrices. The transmitter uses one of those pre-defined matrices to transmit data streams based on the information feedback by all users. In addition, when the codebook is designed, the codebook must be systematically linked to propagation conditions, and simultaneously, a sufficient distance between the matrices must be maintained. In addition, performance is improved if the codebook can be adapted as a function of the propagation conditions. Naturally, a sufficient distance between matrices must be maintained in order to maximize performance.

SUMMARY OF THE INVENTION

General aspects of examples described herein provide a method of transmitting and receiving data in a multi-user MIMO communication system using a codebook designed to be systematically linked to propagation conditions and also to simultaneously maintain a sufficient distance between transmission precoding matrices.

According to one general aspect, there is provided a method of transmitting and receiving data in a multi-user MIMO communication system comprising M transmit antennas. The method includes constituting a codebook with a pre-set basic matrix and precoding matrices obtained in a power pattern of the basic matrix according to a size of the codebook. Data is transmitted and received using the precoding matrices of the codebook. The basic matrix comprises an M×M discrete Fourier transform (DFT) matrix and a rotation matrix. Diagonal element values of the rotation matrix are determined so as to maximize the minimum value of a distance between any two precoding matrices in the codebook.

According to another general aspect, there is provided a transmitter for transmitting data in a multi-user MIMO communication system comprising M transmit antennas. The transmitter includes a memory for storing a codebook constituted of a pre-set basic matrix and precoding matrices obtained in a power pattern of the basic matrix according to a size of the codebook. A precoder precodes data using the precoding matrices of the codebook stored in the memory and transmits the precoded data. The basic matrix includes an M×M discrete Fourier transform (DFT) matrix and a rotation matrix. Diagonal element values of the rotation matrix are determined so as to maximize the minimum value of a distance between any two precoding matrices in the codebook.

According to another general aspect, there is provided a receiver for receiving data in a multi-user MIMO communication system comprising M transmit antennas. The receiver includes a memory storing a codebook constituted of a pre-set basic matrix and precoding matrices obtained in a power pattern of the basic matrix according to a size of the codebook. The codebook is substantially the same as the one used at the transmitter. Preferably, each receiver estimates how each precoding matrix performs in terms of a predefined criterion and the receiver provides feedback to the transmitter. The transmitter then determines how to select the users and at which data rates to transmit.

According to another general aspect, there is provided a non-transitory computer readable medium of instructions for controlling transmission and receipt of data in a multi-user multiple-input multiple-output (MIMO) communication system made of M transmit antennas. The non-transitory computer readable medium includes a first set of instructions configured to control the system to constitute a codebook with a pre-set basic matrix and precoding matrices obtained in a power pattern of the basic matrix according to a size of the codebook, and a second set of instructions configured to control the system to transmit and receive data using the precoding matrices of the codebook. The basic matrix includes an M×M discrete Fourier transform (DFT) matrix and a rotation matrix, and diagonal element values of the rotation matrix are determined so as to maximize a minimum value of a distance between any two precoding matrices in the codebook.

BRIEF DESCRIPTION OF THE DRAWINGS

The above and other features and aspects of examples described herein will become more apparent from the following detailed description when taken in conjunction with the accompanying drawing in which.

Throughout the drawings, like reference numbers will be understood to refer to like elements, features and structures.

DETAILED DESCRIPTION

Examples will be described herein below with reference to the accompanying drawings. In the following description, it should be understood that functions and constructions are described merely to illustrate the examples. Accordingly, those of ordinary skill in the art will readily recognize that various changes and modifications may be made to the examples described herein without departing from the scope and spirit of the claims. Furthermore, descriptions of well-known functions or constructions are omitted for clarity and conciseness. In addition, the terminology described below is defined considering functions in the present invention and may vary according to a user or application. Thus, the definitions should be understood based on all the contents of the specification.

Figure 1A:
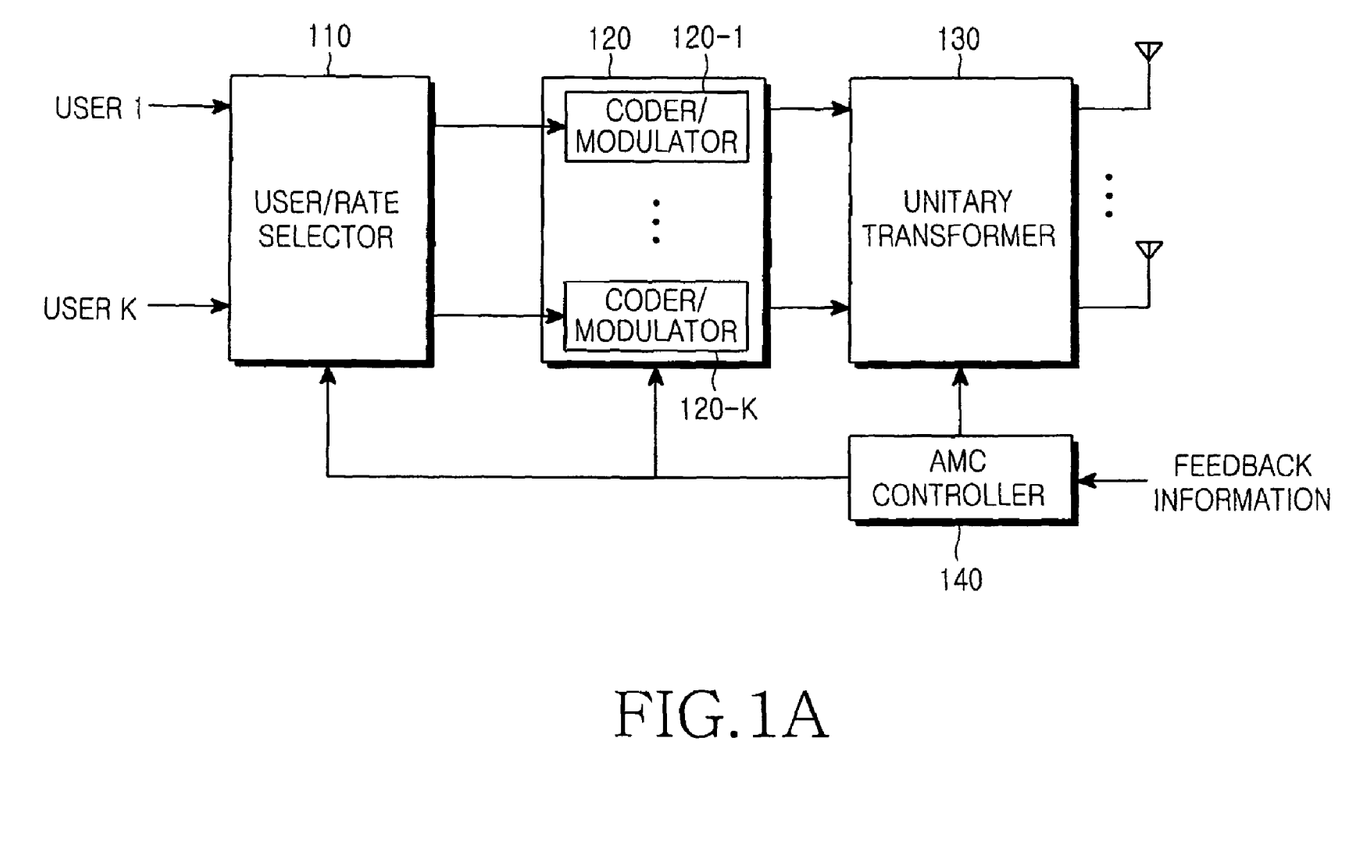
FIG. 1A is a block diagram of an example of a transmitter of a wireless communication system.

FIG. 1A is a block diagram of an example of a transmitter of a multi-user MIMO communication system.

In the illustrated embodiment, a downlink communication system having K multiple users corresponding to multiple transmit antennas of a base transceiver station (BTS) is assumed. Referring to FIG. 1, the transmitter includes a user/rate selector 110, a coding/modulation unit 120, a unitary transformer 130, and an Adaptive Modulation and Coding (AMC) controller 140.

The user/rate selector 110 selects users to which input data is transmitted and a data rate of each of the users based on AMC information provided by the AMC controller 140. The AMC controller 140 calculates the AMC information using feedback information received from terminals (not shown). The user/rate selector 110 outputs data to be transmitted to the terminals to corresponding coders/modulators 120-1, . . . , 120-$k$ in parallel. Each of the coders/modulators 120-1, . . . , 120-$k$ encodes and modulates the data and an encoded and modulated signal to the unitary transformer 130. The unitary transformer 130 transforms the encoded and modulated signals based on the AMC information provided by the AMC controller 140 and respectively transmits the transformed signals through the transmit antennas. Herein, the unitary transformer 130 transforms the encoded and modulated signals using precoding matrices provided from a memory (not shown) included in the AMC controller 140. The memory may be separate from the AMC controller 140.

The multi-user wireless downlink communication system, where the number of users is K, illustrated in FIG. 1A, in which a BTS has multiple transmit antennas and each user has multiple receive antennas, will now be described.

If it is assumed that the BTS has M transmit antennas and a $k^{th}$ user has $N_k$ receive antennas, the total number of receive antennas in the system is $$N = \sum_{k=1}^{K} N_k.$$

Channels used in the system are designed as frequency-flat block fading and additive white Gaussian noise channels. Since interference from adjacent cells is concentrated to a single cell model, the interference is designed as additive Gaussian noise. Channel power of a $k^{th}$ receiver is obtained using $y_k = H_k W x + z_k$. An M×1 input signal vector x is transmitted by the BTS and has power not greater than a total power condition P. That is, $tr(E\lfloor xx^H \rfloor) \leq P$, W denotes a unitary transformation matrix, an M×1 vector $z_k$ denotes random additive noise to the $k^{th}$ user, $z_k \sim N(0, 1)$ ($z_k$ is an additive white noise with independent and identically distributed entries taken from a Gaussian distribution), and a channel $H_k$ denotes an $N_k$×M complex matrix, wherein it is assumed that the elements are independently and identically distributed zero-mean complex-Gaussian random variables and are independent between all users and between antennas of each user. In general, the BTS has channel knowledge limited due to delayed loss feedback signaling.

Figure 1B:
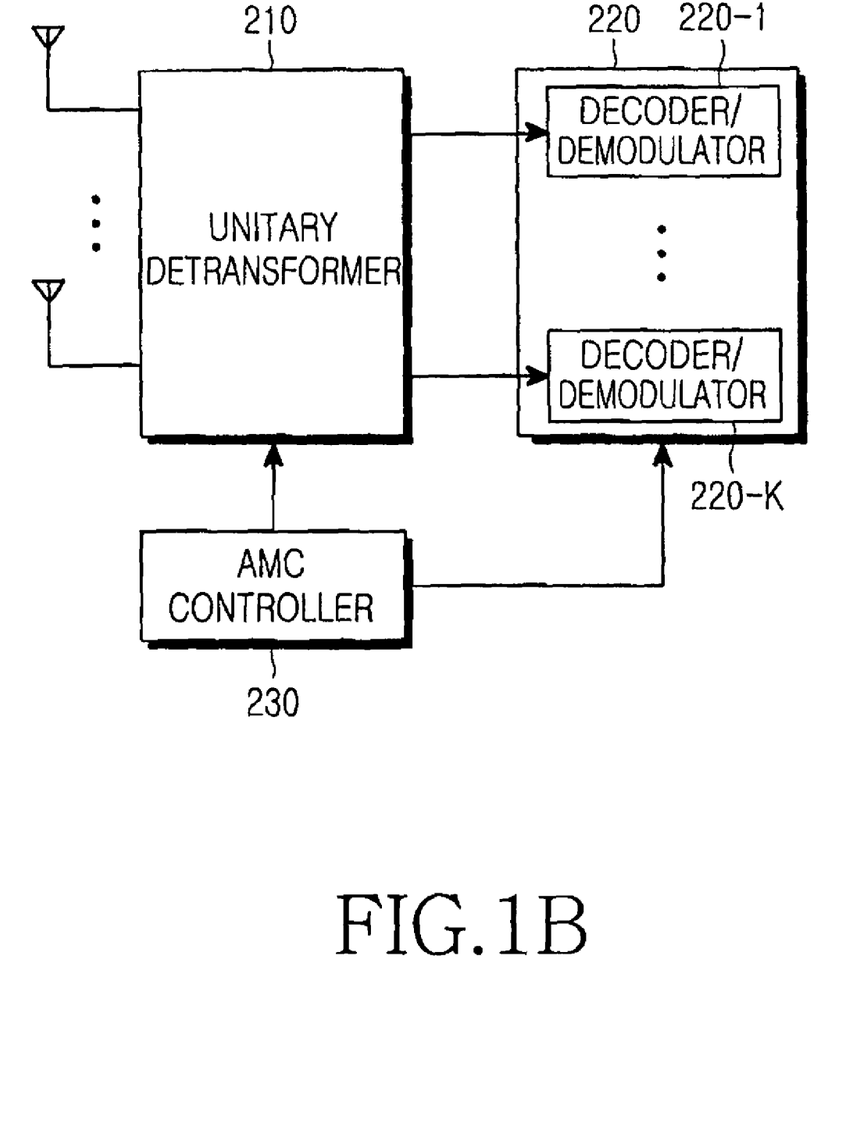
FIG. 1B is a block diagram of an example of a receiver of a wireless communication system.

FIG. 1B is a block diagram of an example of a receiver of a multi-user MIMO communication system.

Referring to FIG. 1B, the receiver (terminal) includes antennas for receiving signals transmitted from the transmitter, a unitary detransformer 210 for detransforming the signals received through the antennas based on AMC information provided by an AMC controller 230. The unitary detransformer 210 includes a receive filter that is applied to separate the different streams. The filter may be designed based on ZF or MMSE criterion. It also may be an ML receiver as well. A decoder/demodulation under 220 includes decoders/demodulators 220-1, . . . , 220-K for decoding and demodulating signals input from the unitary detransformer 210 using precoding matrices. In addition, the receiver includes a memory (not shown) for storing the precoding matrices. The precoding matrices are the same as those stored in the memory of the transmitter and may be pre-set before data communication is performed. Although the memory is included in the AMC controller 230 in FIG. 1B, the memory can be separately included in the receiver.

A codebook design method applied to the unitary transformer 130 will now be described.

A codebook design method used for a MIMO system will be described first.

When a set of precoding matrices, that is, a codebook, is $\gamma = \{U^{(0)} \ldots U^{(2^B-1)}\}$, where B is a codebook size, a $b^{th}$ element of the codebook is $U^{(b)} = [u_0^{(b)} \ldots u_{M-1}^{(b)}]$, wherein $u_{m-1}^{(b)}$ denotes an $m^{th}$ precoding vector of $U^{(b)}$. $u_m^{(b)}$ can be obtained using Equation 1.

$$u_m^{(b)} = \frac{1}{\sqrt{M}}[u_{0m}^{(b)} \ldots u_{(M-1)m}^{(b)}]^T \quad (1)$$

$$u_{nm}^{(b)} = \exp\left\{j\frac{2\pi n}{M}\left(m + \frac{b}{M}\right)\right\}$$

Here, M denotes the number of transmit antennas, and n denotes a row index of a precoding vector.

If the above-described codebook is applied to a precoding technique, a unitary characteristic is maintained as it is. In addition the codebook is regularly created according to the number of transmit antennas. However, although the codebook considers a distance between precoding vectors in each precoding matrix, a distance between precoding matrices is not considered. Furthermore, if the codebook size, that is, B, varies, the set of precoding matrices, that is, the codebook also varies.

Thus, in general aspects of examples described herein, a more efficient codebook design method considering a distance between preceding vectors and a distance between precoding matrices is suggested.

According to one general aspect, in order to minimize a variation of a codebook according to a variation of a codebook size, the codebook is defined as Equation 2.

$$\{EE^2 \ldots E^B\} U^{(i)} \Upsilon_E^{i+1} \quad (2)$$

Here, a basic matrix $E=\theta D$, $\theta=\text{diag}(\exp(j\theta_1), \ldots, \exp(j\theta_M))$ denotes a rotation matrix, and D denotes an M×M discrete Fourier transform (DFT) matrix.

According to Equation 2, the amplitude of each element of every matrix is the same, and since precoding matrices constituting the codebook can be obtained using the basic matrix E even if the codebook size B varies, it is easy to expand the codebook.

Thus, in the codebook design method according to general aspects of examples described herein, θ is set to increase correlation between precoding matrices constituting the codebook. That is, θ can be obtained using Equation 3.

$$(\theta_1^*, \ldots, \theta_M^*) = \arg\max_{\theta_1, \ldots, \theta_M} \min_{i,j} d(U^{(i)}, U^{(j)}) \quad (3)$$

In more detail, $\theta_m^*$ is set to maximize the minimum value of a distance $d(U^{(i)}, U^{(j)})$ between precoding matrices $U^{(i)}$ and $U^{(j)}$ constituting the codebook, wherein $\theta_m^*$ is determined by repetitive calculations, and $d(U^{(i)}, U^{(j)})$ is calculated using Equation 4.

$$d(U^{(i)}, U^{(j)}) = \sqrt{\frac{1}{M-1}\left(M - \sum_{j=0}^{M-1} \max_i |G_{[i,j]}|^2\right)} \quad (4)$$

Here, $G = U^{(i)H} U^{(j)}$.

When M=2, 3, or 4, θ calculated using Equations described above is as follows.

$$\text{When } M = 2, \theta = \begin{bmatrix} e^{-j2.51} & 0 \\ 0 & e^{-j0.21} \end{bmatrix}.$$

$$\text{When } M = 3, \theta = \begin{bmatrix} e^{-j2.24} & 0 & 0 \\ 0 & e^{-j2.90} & 0 \\ 0 & 0 & e^{-j1.56} \end{bmatrix}.$$

$$\text{When } M = 4, \theta = \begin{bmatrix} e^{-j1.24} & 0 & 0 & 0 \\ 0 & e^{j2.72} & 0 & 0 \\ 0 & 0 & e^{j1.52} & 0 \\ 0 & 0 & 0 & e^{-j2.30} \end{bmatrix}.$$

In the codebook design method according to general aspects of examples described herein, a spatially uncorrelated channel environment is assumed. However, a channel environment in a real communication system is spatially correlated, and if a codebook designed according to general aspects of examples described herein is applied to the correlated channel environment, a nonlinear characteristic may appear.

Thus, an example of a method of designing a codebook, which can be applied to even a spatially correlated channel environment, is suggested.

According to other general aspects, a codebook is designed by applying a transmit channel covariance element $R_t$ to the codebook according to general aspects of examples described herein. Since $R_t$ is a transmit covariance matrix and is a long term changed value, a feedback overhead hardly exists.

That is, the codebook according to other general aspects of examples described herein is defined using Equation 5.

$$\left\{ \frac{\sqrt{M} R_t^{1/2} UE}{\|R_t^{1/2} UE\|_F} \quad \frac{\sqrt{M} R_t^{1/2} UE^2}{\|R_t^{1/2} UE^2\|_F} \quad \cdots \quad \frac{\sqrt{M} R_t^{1/2} UE^B}{\|R_t^{1/2} UE^B\|_F} \right\} \quad (5)$$

Here, $\|A\|_F$ denotes a Frobenius norm of a matrix A, and U is defined by $UE = V_{R_t}$, wherein $V_{R_t}$ is a right singular vector of $R_t^{1/2}$.

The Frobenius norm is a matrix norm of the matrix A and is represented by Equation 6.

$$\|A\|_F \equiv \sqrt{\sum_{i=1}^{m} \sum_{j=1}^{n} |a_{ij}|^2} \quad (6)$$

In singular value decomposition (SVD) of the matrix A where $A = USV^*$, a row of U is a left singular vector, and a row of V is a right singular vector, wherein U and V denote orthogonal matrices, S denotes a diagonal vector, and $V^*$ denotes a transposed matrix of a real matrix V or a conjugate transposed matrix of a complex matrix V.

The codebook constituted by Equation 5 is systematically created according to a multi-user MIMO system by rotating the codebook originally designed for i.i.d. channels by the transmit correlation matrix. This way, the codebook is robust to channel correlation.

Each of the transmitter and the receiver stores the codebook in the memory thereof and uses the stored codebook when data is transmitted or received.

Figure 2A:
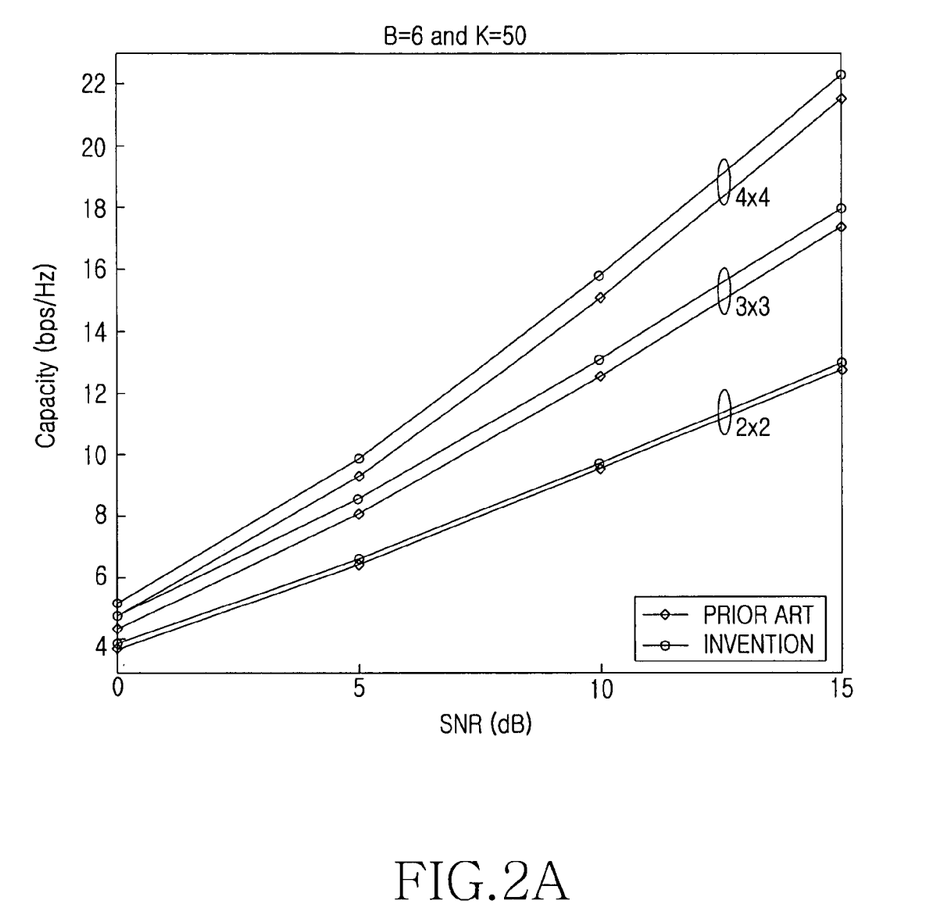
FIGS. 2A and 2B illustrate graphs showing the performance of a system to which an example of a codebook design method is applied.
Figure 2B:
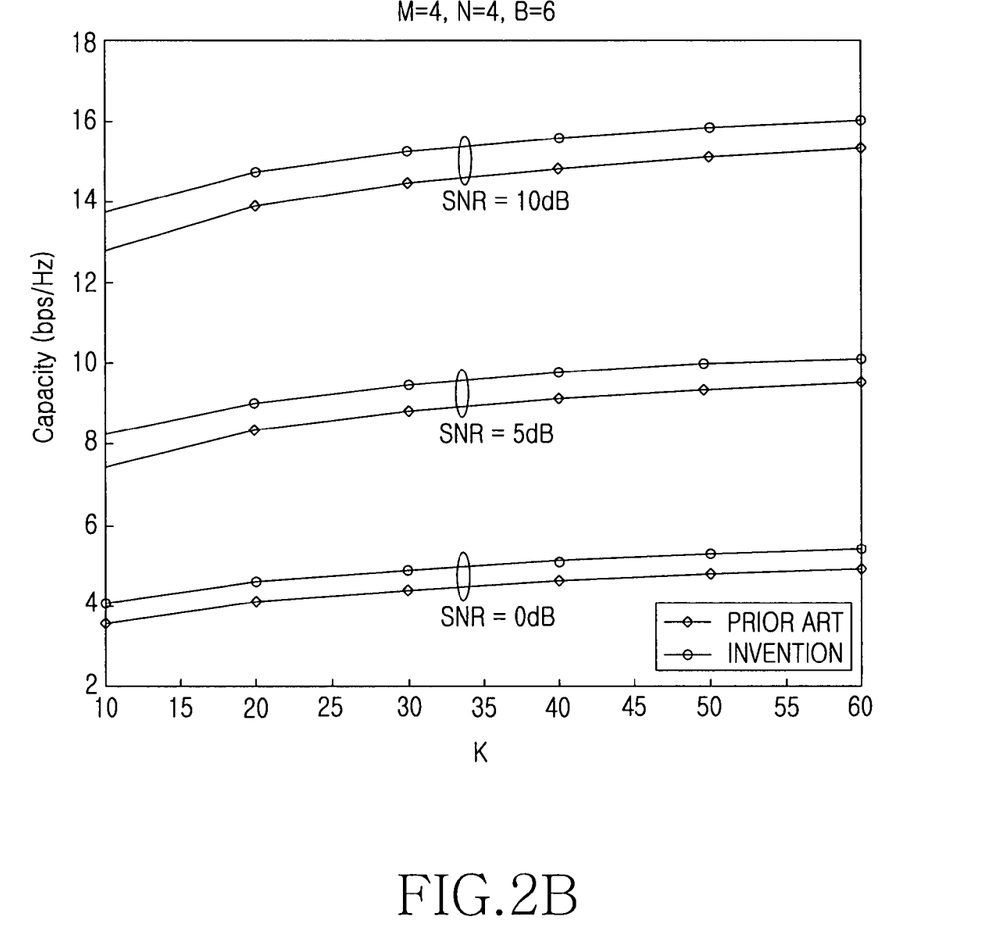

FIGS. 2A and 2B illustrate the performance of a system using a codebook designed according to examples described herein. It should be understood that FIGS. 2A and 2B are intended to illustrate improved performance of examples described herein over the conventional art. However, it should also be understood that the performance gain illustrated is not limiting, and it should be understood that certain examples described herein may have more or less performance gain over the conventional art than shown in FIGS. 2A and 2B.

FIG. 2A illustrates the performance of a system according to a SNR when the number of transmit antennas and the number of receive antennas are 2×2, 3×3, or 4×4 in a case where a codebook according to examples described herein is applied in an uncorrelated environment in which the codebook size B is 6 and the number K of users is 60. As illustrated in FIG. 2A, the system performance is better when a codebook according to examples described herein is used than when a conventional codebook is used.

FIG. 2B illustrates the performance of a system according to the number K of users when a SNR is 0, 5, or 10 dB in a case where a codebook according to examples described herein is applied in an uncorrelated environment in which the number M of transmit antennas is 4, the number N of receive antennas is 4, and the codebook size B is 6. As illustrated in FIG. 2B, the system performance is better when a codebook according to examples described herein is used than when a conventional codebook is used.

Figure 3A:
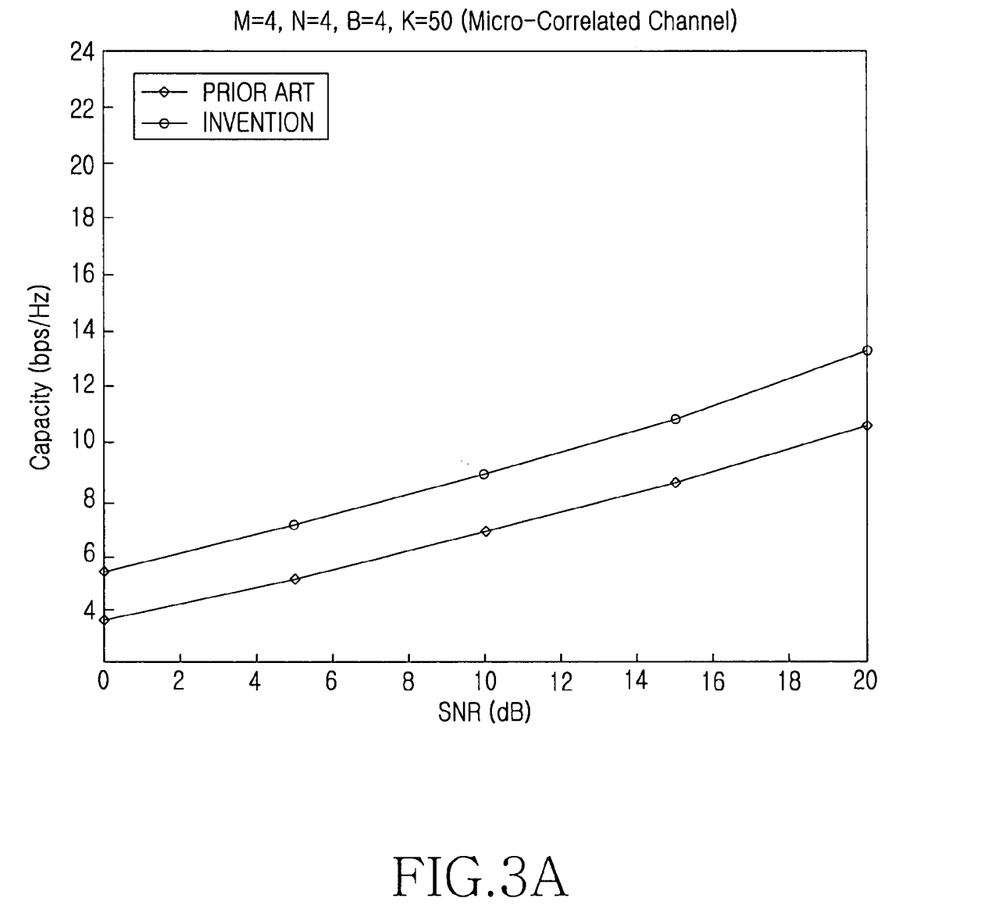
FIGS. 3A and 3B illustrate graphs showing the performance of a system to which another example of a codebook design method is applied.
Figure 3B:
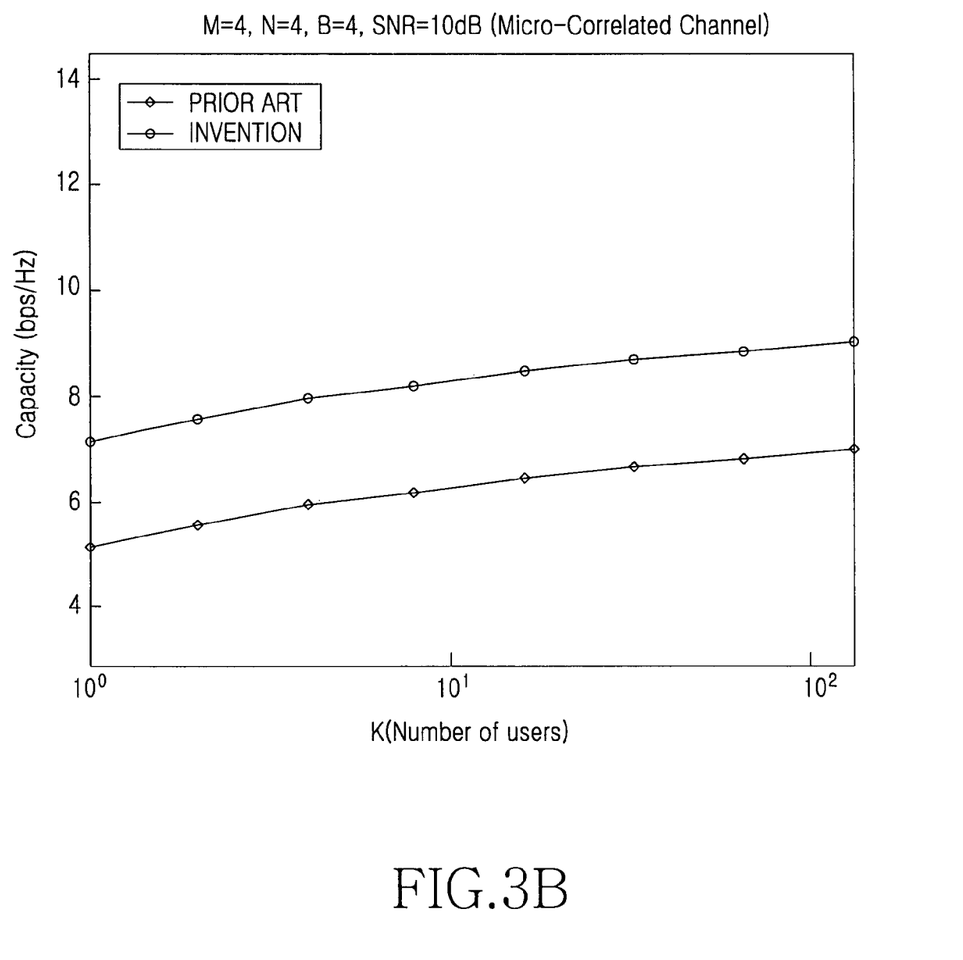

FIGS. 3A and 3B illustrate the performance of a system using a codebook designed according to other examples described herein. Again, it should be understood that FIGS. 3A and 3B are intended to illustrate improved performance of examples described herein over the conventional art. However, it should also be understood that the performance gain illustrated is not limiting, and certain examples described herein may have more or less performance gain over the conventional art than shown in FIGS. 3A and 3B.

FIG. 3A illustrates the performance of a system according to a SNR in a case where a codebook according to other examples described herein is applied in a micro-correlated environment when the number M of transmit antennas is 4, the number N of receive antennas is 4, the codebook size B is 4, and the number K of users is 50. As illustrated in FIG. 3A, the system performance is better when a codebook according to other examples described herein is used than when a conventional codebook is used.

FIG. 3B illustrates the performance of a system according to the number K of users in a case where a codebook according to other examples described herein is applied in a micro-correlated environment when the number M of transmit antennas is 4, the number N of receive antennas is 4, the codebook size B is 4, and a SNR is 10 dB. As illustrated in FIG. 3B, the system performance is better when a codebook according to other examples described herein is used than when a conventional codebook is used.

As described above, according to examples described herein, since precoding matrices of a codebook is constituted using a rotation matrix, expansion of the codebook is easy, and since each of the precoding matrices is determined according to the number of transmit antennas, the codebook is systematically created according to a system by maximizing the minimum distance between precoding matrices. In addition the codebook can be applied to even a correlated channel.

While a few examples are shown and described herein, it will be understood by those of ordinary skill in the art that various changes in form and details may be made therein without departing from the spirit and scope of the appended claims.

What is claimed is:

1. A method of transmitting and receiving data in a multi-user multiple-input multiple-output (MIMO) communication system comprising M transmit antennas, the method comprising:
   constituting a codebook with a pre-set basic matrix and precoding matrices obtained in a power pattern of the basic matrix according to a size of the codebook; and
   transmitting and receiving data using the precoding matrices of the codebook,
   wherein the basic matrix comprises an M×M discrete Fourier transform (DFT) matrix and a rotation matrix, and
   wherein diagonal element values of the rotation matrix are determined so as to maximize a minimum value of a distance between any two precoding matrices in the codebook.

2. The method of claim 1, wherein the basic matrix E is calculated by multiplying the M×M DFT matrix D by the rotation matrix $\Theta = \text{diag}(\exp(j\theta_1), \ldots, \exp(j\theta_M))$.

3. The method of claim 1 or 2, wherein the diagonal element values of the basic matrix are determined so as to maximize the minimum value of a distance between any two random precoding matrices $U^{(i)}$ and $U^{(j)}$.

4. The method of claim 3, wherein the distance between any two precoding matrices $U^{(i)}$ and $U^{(j)}$ is calculated based on the equation below $$d(U^{(i)}, U^{(j)}) = \sqrt{\frac{1}{M-1}\left(M - \sum_{j=0}^{M-1} \max_i |G_{[i,j]}|^2\right)},$$

where $G = U^{(i)H} U^{(j)}$.

5. The method of claim 1, wherein the codebook is constituted by applying a transmit channel covariance element to each of the precoding matrices.

6. The method of claim 5, wherein the codebook to which the transmit channel covariance element is applied is represented by the equation below $$\left\{\frac{\sqrt{M} R_t^{1/2} UE}{\|R_t^{1/2} UE\|_F} \quad \frac{\sqrt{M} R_t^{1/2} UE^2}{\|R_t^{1/2} UE^2\|_F} \quad \cdots \quad \frac{\sqrt{M} R_t^{1/2} UE^{2^B}}{\|R_t^{1/2} UE^{2^B}\|_F}\right\},$$

where $R_t$ denotes the transmit channel covariance element, $\|A\|_F$ denotes a Frobenius norm of a matrix A, $UE = V_{R_t}$, and $V_{R_t}$ denotes a right singular vector of $R_t^{1/2}$.

7. A transmitter for transmitting data in a multi-user multiple-input multiple-output (MIMO) communication system comprising M transmit antennas, the transmitter comprising:
   a memory configured to store a codebook constituted of a pre-set basic matrix and precoding matrices obtained in a power pattern of the basic matrix according to a size of the codebook; and
   a precoder configured to precode data using the precoding matrices of the codebook stored in the memory and transmit the precoded data,
   wherein the basic matrix comprises an M×M discrete Fourier transform (DFT) matrix and a rotation matrix, and
   wherein diagonal element values of the rotation matrix are determined so as to maximize a minimum value of a distance between any two precoding matrices in the codebook.

8. The transmitter of claim 7, wherein the distance between the two precoding matrices $U^{(i)}$ and $U^{(j)}$ is calculated the equation below $$d(U^{(i)}, U^{(j)}) = \sqrt{\frac{1}{M-1}\left(M - \sum_{j=0}^{M-1} \max_i |G_{[i,j]}|^2\right)},$$

where $G = U^{(i)H} U^{(j)}$.

9. The transmitter of claim 7, wherein the codebook is constituted by applying a transmit channel covariance element to each of the precoding matrices.

10. The transmitter of claim 9, wherein the codebook to which the transmit channel covariance element is applied is represented by the equation below $$\left\{ \frac{\sqrt{M} R_t^{1/2} UE}{\|R_t^{1/2}UE\|_F} \quad \frac{\sqrt{M} R_t^{1/2} UE^2}{\|R_t^{1/2}UE^2\|_F} \quad \cdots \quad \frac{\sqrt{M} R_t^{1/2} UE^{2^B}}{\|R_t^{1/2}UE^{2^B}\|_F} \right\},$$

where $R_t$ denotes the transmit channel covariance element, $\|A\|_F$ denotes a Frobenius norm of a matrix A, $UE=V_{R_t}$, and $V_{R_t}$ denotes a right singular vector of $R_t^{1/2}$.

11. A receiver for receiving data using receive antennas from a transmitter of a multi-user MIMO communication system, the transmitter including M transmit antennas, the receiver comprising:
a memory configured to store a codebook constituted of a pre-set basic matrix and precoding matrices obtained in a power pattern of the basic matrix according to a size of the codebook, the basic matrix comprising an M×M discrete Fourier transform (DFT) matrix and a rotation matrix, the rotation matrix having diagonal element values determined so as to maximize a minimum value of a distance between any two precoding matrices in the codebook; and
a decoder configured to:
receive precoded data from the transmitter; and
decode the received precoded data using the precoding matrices of the codebook stored in the memory.

12. The receiver of claim 11, wherein the distance between any two precoding matrices $U^{(i)}$ and $U^{(j)}$ is calculated the equation below $$d(U^{(i)}, U^{(j)}) = \sqrt{\frac{1}{M-1}\left(M - \sum_{j=0}^{M-1} \max_i |G_{[i,j]}|^2\right)},$$

where $G = U^{(i)H} U^{(j)}$.

13. The receiver of claim 12, wherein the codebook is constituted by applying a transmit channel covariance element to each of the precoding matrices.

14. The receiver of claim 13, wherein the codebook to which the transmit channel covariance element is applied is represented by the equation below $$\left\{ \frac{\sqrt{M} R_t^{1/2} UE}{\|R_t^{1/2}UE\|_F} \quad \frac{\sqrt{M} R_t^{1/2} UE^2}{\|R_t^{1/2}UE^2\|_F} \quad \cdots \quad \frac{\sqrt{M} R_t^{1/2} UE^{2^B}}{\|R_t^{1/2}UE^{2^B}\|_F} \right\},$$

where $R_t$ denotes the transmit channel covariance element, $\|A\|_F$ denotes a Frobenius norm of a matrix A, $UE=V_{R_t}$, and $V_{R_t}$ denotes a right singular vector of $R_t^{1/2}$.

15. The receiver of claim 11, wherein a number of the M transmit antennas is equal to a number of the receive antennas.

16. The receiver of claim 11, further comprising:
a unitary detransformer configured to:
detransform the precoded data; and
input the detransformed precoded data to the decoder.

17. A non-transitory computer readable medium of instructions for controlling transmission and receipt of data in a multi-user multiple-input multiple-output (MIMO) communication system made of M transmit antennas, comprising:
a first set of instructions configured to control the system to constitute a codebook with a pre-set basic matrix and precoding matrices obtained in a power pattern of the basic matrix according to a size of the codebook;
a second set of instructions configured to control the system to transmit and receive data using the precoding matrices of the codebook;
wherein the basic matrix comprises an M×M discrete Fourier transform (DFT) matrix and a rotation matrix, and
wherein diagonal element values of the rotation matrix are determined so as to maximize a minimum value of a distance between any two precoding matrices in the codebook.

18. The non-transitory computer readable medium of instructions of claim 17, wherein the first set of instructions is configured to constitute the codebook by applying a transmit channel covariance element to each of the precoding matrices.

\* \* \* \* \*